US012222616B2

(12) United States Patent
Li et al.

(10) Patent No.: US 12,222,616 B2
(45) Date of Patent: Feb. 11, 2025

(54) DISPLAY SUBSTRATE, DISPLAY MODULE AND DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventors: Ting Li, Beijing (CN); Wenhua Song, Beijing (CN); Bo Wu, Beijing (CN); Zhengdong Zhang, Beijing (CN); Pengcheng Zang, Beijing (CN); Yadong Zhang, Beijing (CN)

(73) Assignees: Chengdu BOE Optoelectronics Technology Co., Ltd., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/913,500

(22) PCT Filed: Oct. 26, 2021

(86) PCT No.: PCT/CN2021/126263
§ 371 (c)(1),
(2) Date: Sep. 22, 2022

(87) PCT Pub. No.: WO2022/205864
PCT Pub. Date: Oct. 6, 2022

(65) Prior Publication Data
US 2024/0219788 A1 Jul. 4, 2024

(30) Foreign Application Priority Data

Apr. 2, 2021 (CN) .......................... 202110362305.7

(51) Int. Cl.
G02F 1/1362 (2006.01)
G02F 1/1339 (2006.01)
G02F 1/1368 (2006.01)

(52) U.S. Cl.
CPC .. *G02F 1/136254* (2021.01); *G02F 1/136222* (2021.01); *G02F 1/136286* (2013.01); *G02F 1/1368* (2013.01); *G02F 1/13394* (2013.01)

(58) Field of Classification Search
CPC .......... G02F 1/13394; G02F 1/136254; G02F 1/136222; G02F 1/136286
See application file for complete search history.

(56) References Cited

U.S. PATENT DOCUMENTS

2010/0309421 A1  12/2010  Gotoh et al.
2017/0023641 A1*  1/2017  Gan ..................... G02F 1/1345
2017/0023840 A1*  1/2017  Chen ................. G02F 1/134363

FOREIGN PATENT DOCUMENTS

CN    106292111 A    1/2017
CN    106526918 A    3/2017
(Continued)

*Primary Examiner* — Lucy P Chien
(74) *Attorney, Agent, or Firm* — HOUTTEMAN LAW LLC

(57) ABSTRACT

Provided are a display substrate, a display module and a display device. The display substrate has a display region and a test pad region, and includes: a base; at least one pad on the base and in the test pad region; a first spacing layer on a side of the pad away from the base; multiple support parts and at least one test signal line in the test pad region and on a side of the first spacing layer away from the base, each test signal line has one end connected to one pad and another end connected to an array test device; at least two of the support parts are arranged along a first direction intersecting a direction pointing to the test pad region from the display region, each support part has a support end projecting from a surface of the test signal line away from the base.

20 Claims, 5 Drawing Sheets

(56) References Cited

FOREIGN PATENT DOCUMENTS

| | | |
|---|---|---|
| CN | 206282855 U | 6/2017 |
| CN | 109521584 A | 3/2019 |
| CN | 111596476 A | 8/2020 |
| CN | 112310044 A | 2/2021 |
| CN | 112904632 A | 6/2021 |
| CN | 215067646 U | 12/2021 |
| JP | 2015111191 A | 6/2015 |
| KR | 20140095900 A | 8/2014 |

\* cited by examiner

DISPLAY SUBSTRATE, DISPLAY MODULE AND DISPLAY DEVICE

TECHNICAL FIELD

The present disclosure relates to the field of display technology, and in particular, to a display substrate, a display module and a display device.

BACKGROUND

With the development of the liquid crystal display technology, narrow-bezel or bezelless liquid crystal display devices have become a mainstream trend of high-quality display devices. In order to eliminate an alignment offset between a color filter substrate and an array substrate in a conventional narrow-bezel or bezelless liquid crystal display device, a color filter is generally fabricated on the array substrate, that is, a Color Filter on Array (COA) substrate is formed by adopting the COA technology.

SUMMARY

For solving at least one of technical problems in the related art, the present disclosure provides a display substrate, a display module and a display device.

In order to achieve the above objective, the present disclosure provides a display substrate having a display region and a test pad region disposed on a side of the display region, where the display substrate includes:
  a base;
  at least one pad disposed on the base and located in the test pad region;
  a first spacing layer disposed on a side of the pad away from the base; and
  a plurality of support parts and at least one test signal line, which are located in the test pad region, the support parts and the test signal line are disposed on a side of the first spacing layer away from the base, one end of each test signal line is connected to one pad, and the other end of each test signal line is configured to be connected to an array test device;
  where at least two of the plurality of support parts are arranged along a first direction which intersects a direction pointing to the test pad region from the display region, each of the support parts has a support end away from the base, and the support end projects from a surface of the test signal line on a side away from the base.

In some implementations, at least one first spacer is disposed on the base and located in the test pad region; and
  the first spacing layer covers the first spacer, and a portion of the first spacing layer opposite to the first spacer projects along a direction away from the base to form the support part.

In some implementations, a thin film transistor is further disposed on the base, and the first spacer is disposed in the same layer as an active layer of the thin film transistor.

In some implementations, the first spacer includes a plurality of sub-spacers arranged at intervals, and the plurality of sub-spacers of the same first spacer are arranged along the direction pointing to the test pad region from the display region.

In some implementations, the display substrate further includes: a first electrode, a second electrode and a second spacing layer, which are located in the display region, where the first electrode is disposed between the second spacing layer and the base, and the second electrode is disposed on a side of the second spacing layer away from the base; and
  the first spacing layer and the second spacing layer are disposed in a same layer, and the test signal line and the second electrode are disposed in a same layer.

In some implementations, the display substrate further includes a second spacer disposed in the display region and located on the side of the second spacing layer away from the base, where the support parts are disposed in the same layer as the second spacer.

In some implementations, at least part of each test signal line is covered by the support parts.

In some implementations, the display substrate further includes a color filter and a thin film transistor, which are located in the display region, where the color filter is disposed on a side of the thin film transistor away from the base, and the first electrode is disposed on a side of the color filter away from the base.

In some implementations, the test signal line is located on the side of the pad away from the display region, and extends along the direction pointing to the test pad region from the display region;
  each of the support parts is in a shape of strip, and an extending direction in which the support parts extend is the same as an extending direction in which the test signal line extends; and/or
  each of the support parts is in a shape of block.

In some implementations, the display substrate includes a plurality of test signal lines arranged along the first direction, and each of two sides of each test signal line along the first direction is provided with at least one of the support parts.

In some implementations, at least one of the support parts is disposed between any two adjacent test signal lines.

In some implementations, a thin film transistor is further disposed on the base,
  the pad includes a first body disposed in the same layer as a gate electrode of the thin film transistor; and/or
  the pad includes a second body disposed in the same layer as a source electrode and a drain electrode of the thin film transistor.

In some implementations, the base further includes a first connection line disposed in the test pad region, where one end of the first connection line is connected to the pad, and the other end of the first connection line is configured to be connected to a driver chip.

In some implementations, the base includes a plurality of pads, which include at least one first pad and at least one second pad, and a distance from the first pad to the display region is smaller than that from the second pad to the display region; and
  each first pad overlaps at least one second pad along the direction pointing to the test pad region from the display region.

In some implementations, the display substrate further includes: a plurality of columns of sub-pixels and a plurality of data lines, which are disposed in the display region, where sub-pixels in a same column are connected to a same data line, and each of the sub-pixels is connected to the pad through the data line.

The present disclosure further provides a display module, including: a bezel, and the display substrate described above;
  where the bezel is supported by support ends of the support parts, and an orthographic projection of the bezel on the display substrate surrounds the display region.

The present disclosure further provides a display device, including the display module described above.

BRIEF DESCRIPTION OF DRAWINGS

The accompanying drawings are used to provide a further understanding of the present disclosure, and constitute a part of the specification. The drawings are used to explain the present disclosure in conjunction with specific embodiments below, but do not constitute any limitation to the present disclosure. In the drawings.

DETAIL DESCRIPTION OF EMBODIMENTS

The specific embodiments of the present disclosure will be described in detail below with reference to the drawings. It should be understood that the specific embodiments described herein are merely intended to illustrate and explain the present disclosure, rather than limiting the present disclosure.

Unless otherwise defined, technical terms or scientific terms used in the embodiments of the present disclosure should have general meanings that are understood by those of ordinary skills in the technical field of the present disclosure. The words "first", "second" and the like used herein do not denote any order, quantity or importance, but are just used to distinguish between different components. Similarly, the words "include/including", "comprise/comprising" and the like indicate that an element or object before the words covers the elements or objects or the equivalents thereof listed after the words, rather than excluding other elements or objects. The words "connect/connecting", "couple/coupling" and the like are not restricted to physical or mechanical connection, but may also indicate electrical connection, whether direct or indirect. The words "on", "under", "left", "right" and the like are only used to indicate relative positional relationships. When an absolute position of an object described is changed, the relative positional relationships may also be changed accordingly.

Figure 1A:
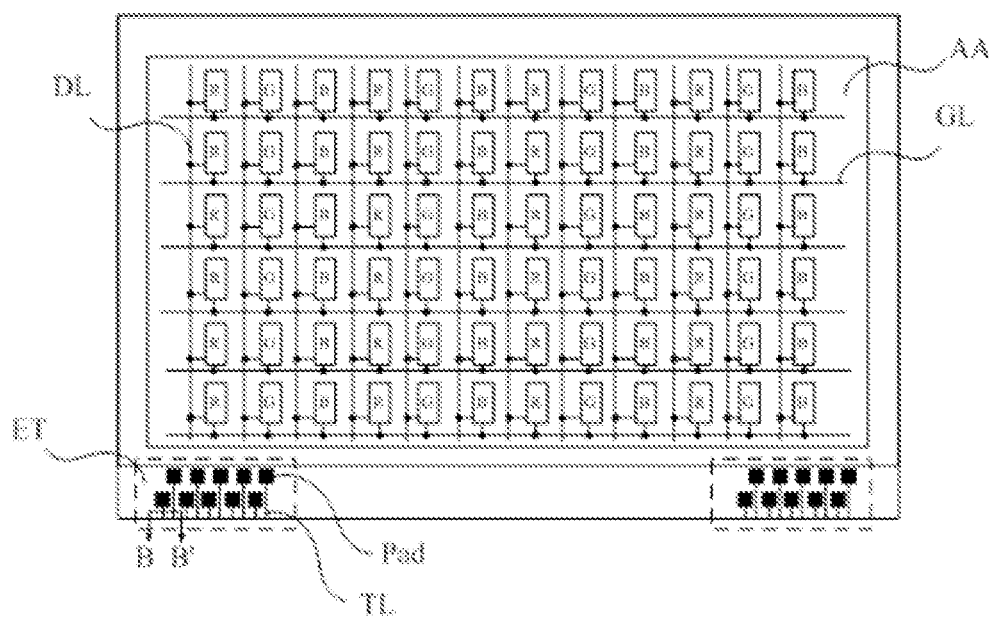
FIG. 1a is a plan view of a display substrate according to an example.

FIG. 1a is a plan view of a display substrate according to an example. As shown in FIG. 1a, a COA display substrate has a display region AA and a test pad region ET on a side of the display region AA. A plurality of scanning lines GL and a plurality of data lines DL are disposed in the display region AA; and the plurality of scanning lines GL and the plurality of data lines DL intersect to define a plurality of sub-pixels. Illustratively, every three adjacent sub-pixels along a row direction constitute one pixel unit, and the three adjacent sub-pixels (e.g., a red sub-pixel R, a green sub-pixel G, and a blue sub-pixel B) are configured to display different colors. The sub-pixels in a same row are supplied with a scanning signal by a same scanning line GL, and the sub-pixels in a same column are supplied with a data voltage signal by a same data line DL.

A test signal line TL and a pad Pad are disposed in the test pad region ET, and the test signal line TL is connected to a signal line in the display region AA through the pad Pad. For example, the test signal line TL is connected to a data line DL in the display region AA through the pad Pad, and specifically, the pad Pad is connected to the data line DL through a connection line led out from the display region AA. When an array test is carried out, an array test device is connected to the test signal line TL to provide a test signal for the data line DL in the display region AA through the test signal line TL and the pad Pad, so as to test whether each sub-pixel in the display region AA has a defect.

Figure 1B:
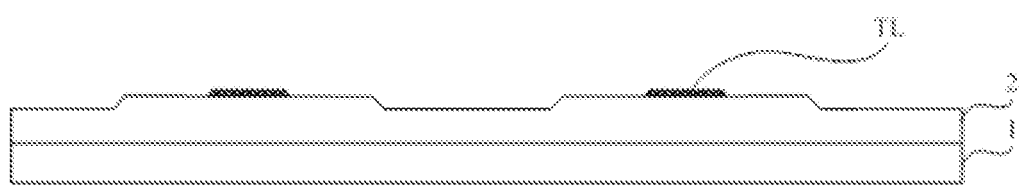
FIG. 1b is a sectional view of FIG. 1a taken along a line BB'.
Figure 1C:
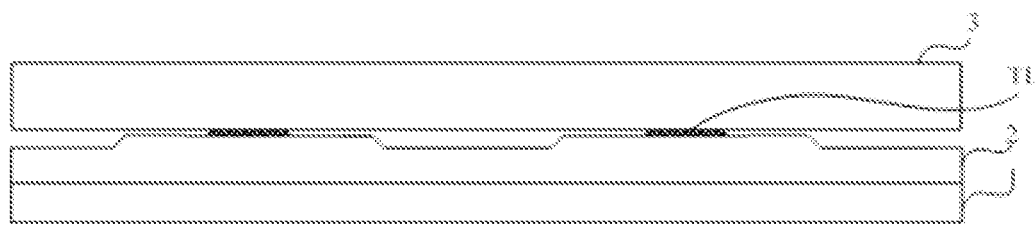
FIG. 1c is a schematic diagram illustrating an example in which a display substrate and a bezel are assembled.

FIG. 1b is a sectional view of FIG. 1a taken along a line BB'. As shown in FIG. 1b, the display substrate includes: a base substrate 1, a functional film layer 2 disposed on the base substrate 1, and the test signal line TL disposed on a side of the functional film layer 2 away from the base substrate 1. FIG. 1c is a schematic diagram illustrating an example in which the display substrate and a bezel are assembled. As shown in FIG. 1c, when a bezel 3 provided with a metal part and the display substrate are assembled with each other, the bezel 3 is directly pressed on the test signal line TL, resulting in contact of the metal part of the bezel 3 with the test signal line TL, so that different test signal lines TL are short-circuited, which causes a short circuit of different data lines in the display region AA, thus causing a display failure.

Figure 2:
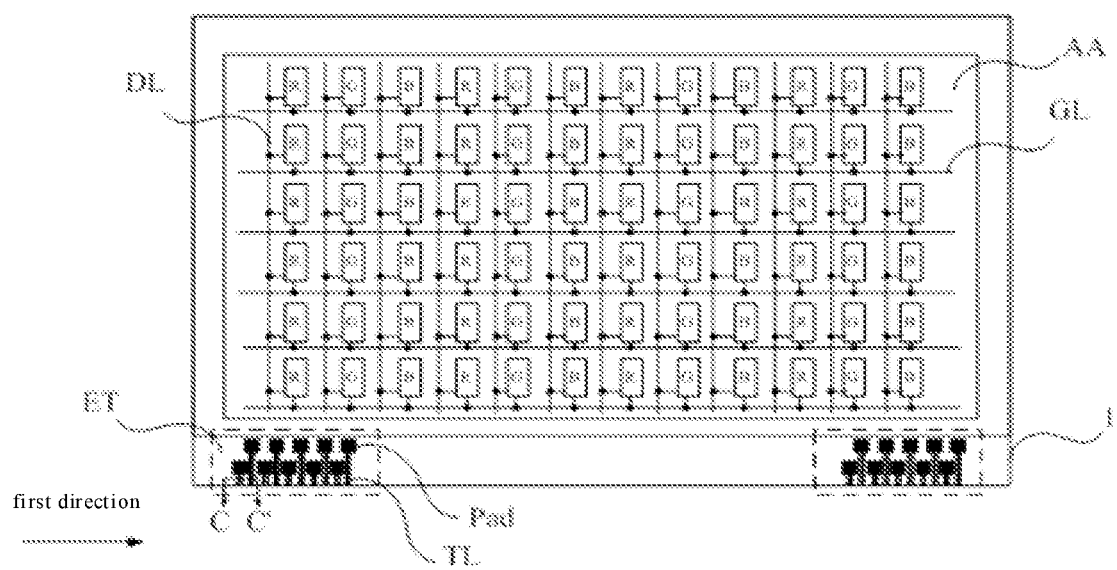
FIG. 2 is a plan view of a display substrate according to an embodiment of the present disclosure.
Figure 3A:
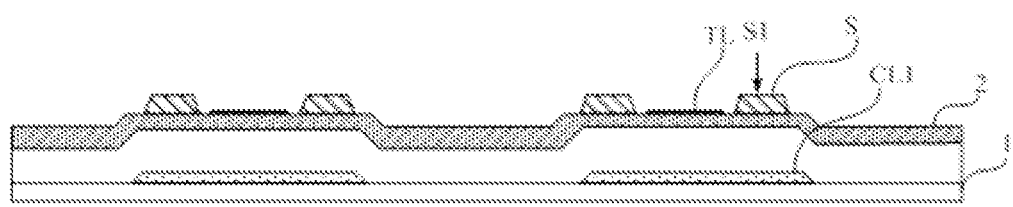
FIG. 3a is a sectional view of FIG. 2 taken along a line CC'.

In view of the above, an embodiment of the present disclosure provides a display substrate, and FIG. 2 is a plan view of the display substrate according to the embodiment of the present disclosure. As shown in FIG. 2, the display substrate has a display region AA, and a test pad region ET located on a side of the display region AA. A portion of the display substrate located in the display region AA includes: elements for displaying images, such as thin film transistors, scanning lines GL, data lines DL, a common electrode and pixel electrodes. FIG. 3a is a sectional view of FIG. 2 taken along a line CC'. As shown in FIG. 2 and FIG. 3a, the display substrate includes: a base 1; a first connection line CL1 (which will be described in detail below and thus is not described here) and at least one pad Pad, which are disposed on the base 1; a first spacing layer 2 disposed on a side of the pad Pad away from the base 1; and a plurality of support parts S and at least one test signal line TL, which are disposed on a side of the first spacing layer 2 away from the base 1. The pad Pad, the plurality of support parts S, and the at least one test signal line TL are all located in the test pad region ET, and the pad Pad may be disposed in the same layer as the first connection line CL1. One end of each test signal line TL is connected to one pad Pad, and the other end of each test signal line TL is configured to be connected to the array test device. At least two of the plurality of support parts S are arranged along a first direction which intersects a direction pointing to the test pad region ET from the display region AA, each support part 3 is provided with a support end S1 away from the base 1, and the support end S1 projects from a surface of the test signal line TL on a side away from the base 1.

Figure 3B:
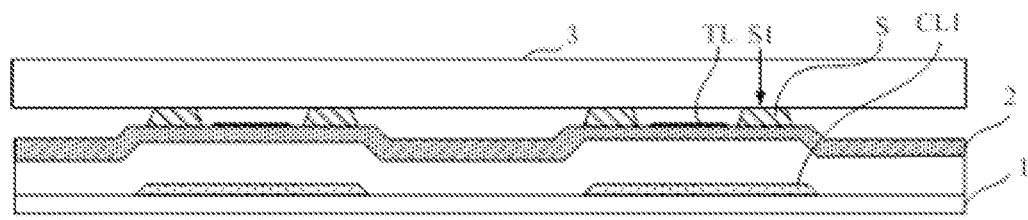
FIG. 3b is a schematic diagram illustrating an example in which a display substrate and a bezel are assembled according to an embodiment of the present disclosure.

In the embodiment of the present disclosure, the pad Pad may be connected to a display signal line in the display region AA. For example, the pad Pad is connected to a data line DL in the display region AA, and specifically, the pad Pad may be connected to the data line DL through a connection line. The test signal line TL may be disposed in the same layer as a driving electrode, such as a second electrode 46 shown in FIG. 4, in the display region AA, which will be described in detail below and thus is not described here. FIG. 3b is a schematic diagram illustrating an example in which the display substrate and the bezel are assembled with each other according to the embodiment of the present disclosure. As shown in FIG. 3b, after the bezel 3 and the display substrate are assembled with each other, the support parts S can perform a supporting function to space the test signal line TL apart from the bezel 3 because the support ends S1 of the support parts S are higher than the test signal line TL, so that the contact of the test signal line TL with the metal part of the bezel 3 can be avoided, and the problem of the consequent short circuit of the test signal line TL can be avoided, thereby improving a yield of display products.

A specific structure of the display substrate according to the embodiment of the present disclosure is described in detail below. Specifically, as shown in FIG. 2, the display substrate includes a plurality of rows of scanning lines GL and a plurality of columns of data lines DL, which are located in the display region AA, and the plurality of rows of scanning lines GL and the plurality of columns of data lines DL intersect to define a plurality of sub-pixels. Illustratively, every three adjacent sub-pixels along a row direction constitute one pixel unit, and the multiple sub-pixels in a same pixel unit are different in color, for example, the same pixel unit includes a red sub-pixel R, a green sub-pixel G, and a blue sub-pixel B. The sub-pixels in a same row are supplied with a scanning signal by a same scanning line GL, and the sub-pixels in a same column are supplied with a data voltage signal by a same data line DL. The scanning lines GL are connected to a gate driving circuit, and the data lines DL may be connected to the pad Pad through the connection line.

Figure 4:
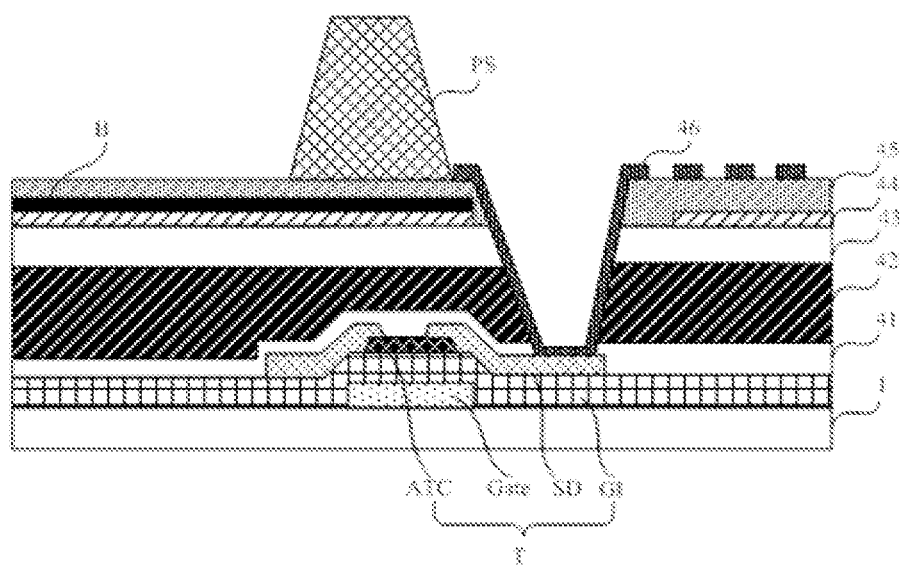
FIG. 4 is a sectional view of a sub-pixel according to an embodiment of the present disclosure.

In the embodiment of the present disclosure, the display substrate may be the COA display substrate. FIG. 4 is a sectional view of a sub-pixel according to an embodiment of the present disclosure. As shown in FIG. 4, each sub-pixel includes: a thin film transistor T disposed on the base 1; a first passivation layer 41 covering the thin film transistor T; and a color filter 42, a second passivation layer 43, a first electrode 44, a second spacing layer 45 and a second electrode 46, which are sequentially disposed along a direction away from the thin film transistor T.

In the embodiment of the present disclosure, a material of the first passivation layer 41 (the second passivation layer 43) may include a silicon compound such as silicon oxide, silicon nitride or silicon oxynitride. In some implementations, a thickness of the second passivation layer 43 may be set to be between 0.5 μm and 3 μm, such as between 1.3 μm and 2 μm. The color filter 42 may be a red filter, a green filter, or a blue filter. A thickness of the color filter 42 may be set to be between 1 μm and 4 μm, such as 2.7 μm.

One of the first electrode 44 and the second electrode 46 is a pixel electrode, and the other of the first electrode 44 and the second electrode 46 is a common electrode. Optionally, in the embodiments of the present disclosure, the first electrode 44 serves as the common electrode, and the second electrode 46 serves as the pixel electrode. The first electrode 44 and the second electrode 46 may be made of a light-transmitting material such as indium tin oxide (ITO). Optionally, the second electrode 46 is a slit electrode, and the first electrode 44 is a plate electrode, so that an electric field may be generated between the first electrode 44 and the second electrode 46. When the display substrate is used in a display panel, the display substrate and an opposite substrate are disposed opposite to each other, with a liquid crystal layer disposed therebetween, and the electric field generated between the first electrode 44 and the second electrode 46 may deflect liquid crystals in the liquid crystal layer, thereby adjusting transmittance of the liquid crystal layer. In some implementations, a thickness of the first electrode 44 (the second electrode 46) may be set to be between 0.01 μm and 0.2 μm, such as 0.08 μm.

In some implementations, the first spacing layer 2 and the second spacing layer 45 are disposed in a same layer, and the test signal line TL and the second electrode 46 are disposed in a same layer. It should be noted that "disposed in a same layer" in the embodiments of the present disclosure refers to that the two structures are formed of the same material layer by one patterning process, so the two structures are located in the same layer in terms of stacking relationship; but "disposed in the same layer" does not mean that a distance between one of the two structures and the base is necessarily the same as that between the other one of the two structures and the base.

A material of the second spacing layer 45 includes an insulating material, and the second spacing layer 45 is configured to maintain electrical insulation between the first electrode 44 and the second electrode 46. The material of the second spacing layer 45 may include a silicon compound and a metal oxide. For example, the material of the second spacing layer 45 may include silicon oxynitride (SiON), silicon oxide (SiOx), silicon nitride (SiNx), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), and titanium oxide (TiOx), and the like. The second spacing layer 45 may be formed into a single-layer structure or a multi-layer structure. In some implementations, a thickness of the second spacing layer 45 may be set to be between 0.1 μm and 1 μm, such as 0.6 μm.

In the embodiment of the present disclosure, the thin film transistor T may have a top gate structure or a bottom gate structure, which is not limited herein. Taking a case where the thin film transistor T has the bottom gate structure as an example, the thin film transistor T includes a gate electrode Gate, a gate insulating layer GI, an active layer ACT and a source-drain metal layer SD, which are sequentially disposed along a direction away from the base 1. The base 1 may be a glass base. The source-drain metal layer SD includes a source electrode and a drain electrode spaced apart from each other, the active layer ACT includes a source connection portion connected to the source electrode, a drain connection portion connected to the drain electrode, and a channel portion disposed between the source connection portion and the drain connection portion, and the first passivation layer 41 covers the active layer ACT and the source-drain metal layer SD. The second electrode 46 may be connected to the drain electrode of the thin film transistor T through a via penetrating through the second spacing layer 45, the second passivation layer 43, the color filter 42 and the first passivation layer 41.

A material of the gate electrode Gate may include a metal, a metal alloy, a metal nitride, a conductive metal oxide, a transparent conductive material and the like. For example, the material of the gate electrode Gate may include gold (Au), a gold alloy, silver (Ag), a silver alloy, aluminum (Al), an aluminum alloy, aluminum nitride (AlNx), tungsten (W), tungsten nitride (WNx), copper (Cu), a copper alloy, nickel (Ni), chromium (Cr), chromium nitride (CrNx), molybdenum (Mo), a molybdenum alloy, titanium (Ti), titanium nitride (TiNx), platinum (Pt), tantalum (Ta), tantalum nitride (TaNx), neodymium (Nd), scandium (Sc), strontium ruthenium oxide (SRO), zinc oxide (ZnOx), tin oxide (SnOx), indium oxide (InOx), gallium oxide (GaOx), indium tin oxide (ITO), indium zinc oxide (IZO) and the like. The gate electrode Gate may have a single-layer structure or a multi-layer structure. In some implementations, a thickness of the gate electrode Gate may be set to be between 0.1 μm and 1 μm, such as 0.3 μm.

A material of the gate insulating layer GI may include a silicon compound and a metal oxide. For example, the material of the gate insulating layer GI includes silicon oxynitride (SiON), silicon oxide (SiOx), silicon nitride (SiNx), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), and the like. Moreover, the gate insulating layer GI may have a single-layer structure or a multi-layer structure.

A material of the active layer ACT may include, for example, an inorganic semiconductor material (e.g., polysilicon or amorphous silicon), an organic semiconductor material and an oxide semiconductor material. Each of the source connection portion and the drain connection portion may be doped with impurities (e.g., N-type impurities or P-type impurities) at an impurity concentration higher than that of the channel portion. The channel portion is directly opposite to the gate electrode Gate of the thin film transistor T. When a voltage signal applied to the gate electrode Gate reaches a certain value, a carrier path is generated in the channel portion, thereby electrically connecting the source electrode to the drain electrode of the thin film transistor T. In some implementations, a thickness of the active layer ACT may be set to be between 0.05 μm and 0.5 μm, such as 0.2 μm.

A material of the source-drain metal layer SD may include a metal, an alloy, a metal nitride, a conductive metal oxide, a transparent conductive material and the like, and the source-drain metal layer SD may be a single metal layer or a lamination of multiple metal layers, such as a lamination of Mo/Al/Mo or a lamination of Ti/Al/Ti. In some implementations, a thickness of the source-drain metal layer SD may be set to be between 0.2 μm and 0.4 μm, such as 0.3 μm.

In some implementations, each sub-pixel further includes: a black matrix B located above the thin film transistor T. The black matrix B may be located above or below the first electrode 44. Optionally, the black matrix B is located above the first electrode 44 in the embodiment of the present disclosure. A color of the black matrix B may be black, so that light absorption performance of the black matrix B may be enhanced, and reflection of ambient light by the black matrix B may be reduced, thereby improving display contrast.

In some implementations, the display substrate further includes a second spacer PS disposed in the display region AA, and the second spacer PS is located on a side of the second spacing layer 45 away from the base 1, and is configured to maintain a cell thickness of the display panel after the display substrate is aligned and assembled with the opposite substrate to form a cell.

In some implementations, the support parts S may be obtained in a fabrication process of a certain film layer in the display region AA, so that addition of a new process may be avoided while solving the problem of the contact of the test signal line TL with the metal part of the bezel 3, thereby reducing production cost.

Figure 5A:
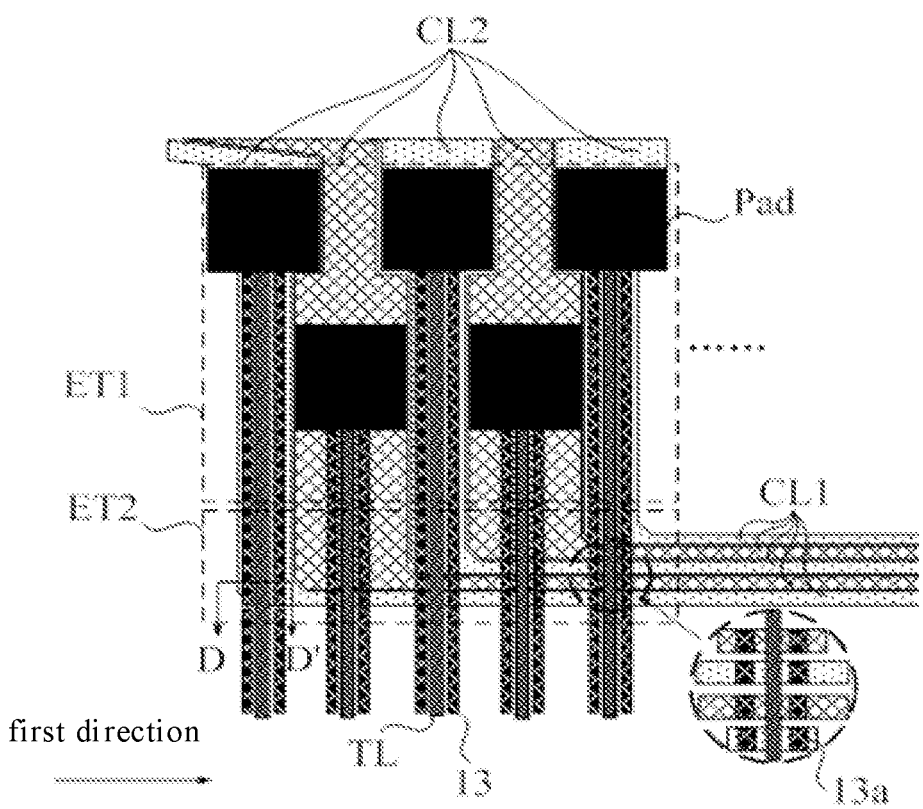
FIG. 5a is a schematic diagram of a specific structure of a test pad region according to an embodiment of the present disclosure.
Figure 5B:
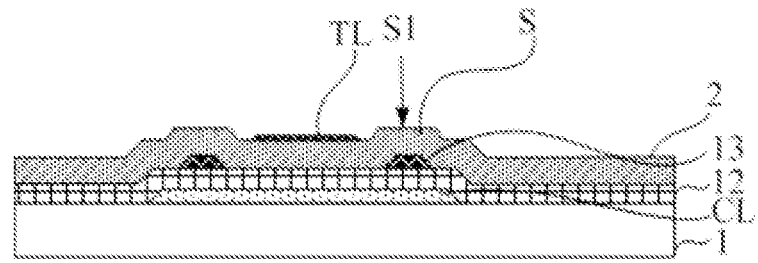
FIG. 5b is a sectional view of FIG. 5a taken along a line DD'.

FIG. 5a is a schematic diagram of a specific structure of the test pad region according to an embodiment of the present disclosure, and FIG. 5b is a sectional view of FIG. 5a taken along a line DD'. As shown in FIG. 2, FIG. 4, FIG. 5a and FIG. 5b, In some implementations, at least one first spacer 13 is disposed on the base 1 and located in the test pad region ET, the first spacing layer 2 covers the first spacer 13, and a portion of the first spacing layer 2 opposite to the first spacer 13 projects along the direction away from the base 1 to form the support part S.

In some implementations, the first spacer 13 may be disposed in the same layer as a patterned film layer having a relatively large thickness in the display region AA. Specifically, the first spacer 13 is disposed in the same layer as the active layer ACT of the thin film transistor T in the display region AA, and a thickness of the first spacer 13 may be the same as that of the active layer ACT. In this way, only by adjusting a pattern of a mask configured to fabricate the active layer ACT, the first spacer 13 may be fabricated in the test pad region ET while fabricating the active layer ACT in the display region AA, and then the support part S may be obtained, without adding a new fabrication process.

In the embodiment of the present disclosure, the thickness of the active layer ACT may be set to be about 0.2 μm, the test signal line TL is disposed in the same layer as the second electrode 46, a thickness of the test signal line TL is generally set to be about 0.08 μm, and the thickness of the active layer ACT is significantly greater than that of the test signal line TL. Therefore, after the first spacing layer 2 is disposed to cover the first spacer 13, a thickness of the projecting portion (i.e., the support part) of the first spacing layer 2 is significantly greater than that of the test signal line TL, so that the support end S1 of the support part S may project from the surface of the test signal line TL on a side away from the base only by disposing the support part S at a proper position. For example, a height difference between a region of the first spacing layer 2 where the support part S is disposed and a region of the first spacing layer 2 where the test signal line TL is disposed is made less than a thickness difference between the first spacer 13 and the test signal line TL.

Apparently, the first spacer 13 may be disposed in the same layer as another patterned film layer having a relatively large thickness in the display region AA, for example, the first spacer 13 is disposed in the same layer as the second passivation layer 43 provided with a via therein.

In some implementations, an area of a cross section of the support part S gradually increases along a direction close to the base 1, so that the support part S may be endowed with good stability.

In some implementations, the test signal line TL is located on a side of the pad Pad away from the display region AA, and extends along the direction pointing to the test pad region ET from the display region AA. The support parts S each are in a shape of strip, and an extending direction of the support parts S in which the support parts S extend is the same as that of the test signal line TL; and/or the support parts S each are in a shape of block, for example, orthographic projections of the block-shaped support parts S on the base 1 are polygonal or circular. Optionally, the strip-shaped support parts S are adopted in the embodiment of the present disclosure.

In some implementations, a plurality of test signal lines TL are provided, and are arranged along the first direction. In the embodiment of the present disclosure, the specific number of the support parts S is not limited, and may be specifically set according to actual needs. For example, one support part S may be disposed every N test signal lines TL, with N being a positive integer.

In some implementations, each of two sides of each test signal line TL along the first direction C is provided with at least one support part S. Thus, both of the left side and the right side of any one test signal line TL are provided with the support parts S, which is favorable for improvement in support stability.

In some implementations, at least one support part S is disposed between any two adjacent test signal lines TL, thereby further improving the support stability of the support parts S.

In some implementations, each test signal line TL corresponds to two support parts S, the two support parts S corresponding to each test signal line TL and the first spacing layer 2 form a groove, the test signal line TL is located at the bottom of the groove, and the support parts S corresponding to different test signal lines TL are different.

The pad Pad in the embodiment of the present disclosure is illustrated below. In some implementations, the pad Pad includes a first body disposed in the same layer as the gate electrode Gate of the thin film transistor T. In the test pad region ET, the test signal line TL may be connected to the pad Pad through a first via penetrating through the first spacing layer 2.

In some other implementations, the pad Pad includes a second body disposed in the same layer as the source electrode and the drain electrode of the thin film transistor T. In the embodiment of the present disclosure, the pad Pad may be connected to the test signal line TL corresponding thereto through a via penetrating through a film layer therebetween.

In some other implementations, the pad Pad may be a double-layer pad, that is, the pad Pad includes the first body and the second body, the first body is disposed in the same layer as the gate electrode Gate of the thin film transistor T, and the second body is disposed in the same layer as the source-drain metal layer SD of the thin film transistor T. In the embodiment of the present disclosure, the test signal line TL may be connected to the first body or the second body, which may be specifically set according to actual needs and is not limited herein.

In some implementations, the display substrate further includes a first connection line CL1 and an insulating layer 12 disposed in the test pad region ET. The first connection line CL1 is disposed on the base 1, one end of the first connection line CL1 is connected to the pad Pad, the other end of the first connection line CL1 is configured to be connected to a driver chip (IC), and the first connection line CL1 is disposed in the same layer as the gate electrode of the thin film transistor T. The insulating layer 12 may be disposed in the same layer as the gate insulating layer GI in the display region AA.

In the embodiment of the present disclosure, the first connection line CL1 is connected to the driver chip, and the driver chip may provide a driving signal for the display signal line in the display region AA through the first connection line CL1 and the pad Pad. For example, the display signal line may be the data line DL described above, or may be another signal line, such as a first power line VDD, a second power line VS, or a reference signal line Vint.

In the embodiment of the present disclosure, the test pad region ET is divided into a first subregion ET1 close to the display region AA, and a second subregion ET2 located on a side of the first subregion away from the display region AA. In the first subregion ET1, the first connection line CL1 extends along a direction in which the display region AA and the test pad region ET are arranged, and orthographic projections of the test signal line TL and the support part S on the first spacing layer 2 are all located within an orthographic projection of the first connection line CL1 on the first spacing layer 2. In the second subregion ET2, an extending direction in which the first connection line CL1 extends is changed to be along the first direction.

In the embodiment of the present disclosure, the first spacer 13 is disposed in the same layer as the active layer ACT, and a material of the first spacer 13 is a semiconductor material. Thus, the first spacer 13 may interfere with a signal in a nearby first connection line CL1. For solving such problem, the first spacer 13 may be configured as a plurality of sub-spacers 13a spaced apart from each other. Specifically, in some implementations, the first spacer 13 includes a plurality of sub-spacers 13a arranged at intervals, and the plurality of sub-spacers 13a of a same first spacer 13 are arranged along the direction pointing to the test pad region ET from the display region AA.

As shown in FIG. 5a, in the second subregion ET2, the first spacers 13 extend along the direction pointing to the test pad region ET from the display region AA, and an extending direction in which the first spacers 13 extend intersects an extending direction in which a plurality of first connection lines CL1 extend. In the embodiment of the present disclosure, the first spacers 13 may be cut off at intersections of different first connection lines CL1, so as to form a plurality of sub-spacers 13a, thereby reducing the interference of the first spacers 13 with the first connection lines CL1.

In some implementations, the display substrate includes a plurality of pads Pad, which includes at least one first pad and at least one second pad, and a distance from the first pad to the display region AA is smaller than that from the second pad to the display region AA. Each first pad overlaps at least one second pad along the direction pointing to the test pad region ET from the display region AA. With such arrangement, more pads Pad may be disposed in a region having a relatively small horizontal size, which may improve space utilization.

In some implementations, a portion of the base 1 located in the display region AA includes a plurality of columns of sub-pixels and a plurality of data lines DL, the sub-pixels in a same column are connected to a same data line DL, and each sub-pixel is connected to a pad Pad through the data line DL connected to the sub-pixel.

In the embodiment of the present disclosure, the sub-pixels are connected to the pads Pad through the data lines DL. Specifically, the pads Pad are connected to the data lines DL in the display region AA through second connection lines CL2 extending out from the display region AA. Each Pad is connected to at least one data line DL. Each second connection line CL2 may be provided with a gating module (e.g., a thin film transistor) configured to control the pad Pad to be electrically connected to or electrically disconnected from the data line DL corresponding to the pad Pad according to a received control signal, so that the pads Pad may transmit electrical signals to the plurality of data lines DL in a predetermined order.

In some implementations, the second connection lines CL2 may be led out from a side of the display region AA close to the test pad region ET, or may be led out from a side of the display region AA away from the test pad region ET; and in a case where the second connection lines CL2 are led out from the side of the display region AA away from the test pad region ET, the second connection lines CL2 may extend into the test pad region ET by passing through bezel regions on a left side and a right side of the display region AA.

Figure 6A:
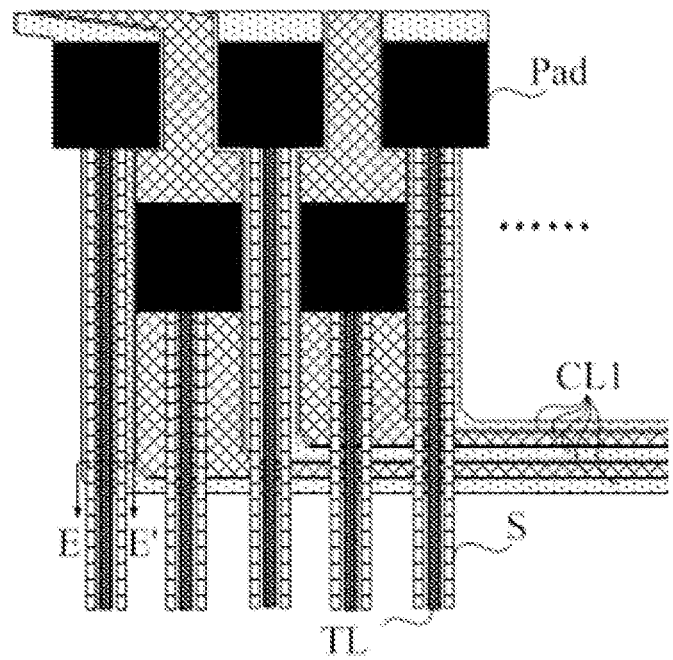
FIG. 6a is another structural diagram of a specific structure of a test pad region according to an embodiment of the present disclosure.
Figure 6B:
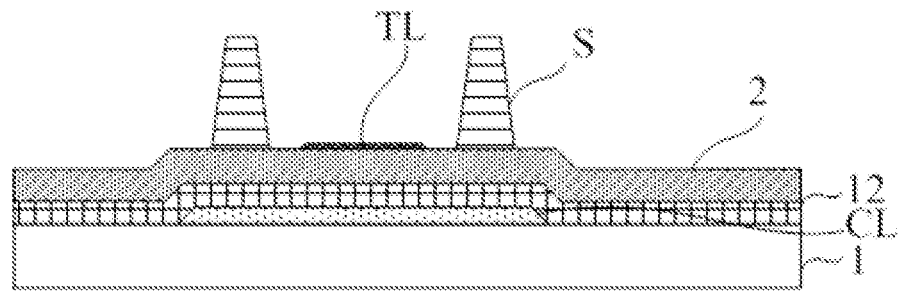
FIG. 6b is a sectional view of FIG. 6a taken along a line EE'.

FIG. 6a is another structural diagram of a specific structure of the test pad region according to an embodiment of the present disclosure, and FIG. 6b is a sectional view of FIG. 6a taken along a line EE'. As shown in FIG. 2, FIG. 4, FIG. 6a and FIG. 6b, in some other implementations, the support parts S are disposed in the same layer as the second spacer PS in the display region AA, and a thickness of the support parts S may be the same as that of the second spacer PS.

In the embodiment of the present disclosure, the second spacer PS is configured to perform a supporting function after the display substrate and the opposite substrate are aligned and assembled with each other to form the cell, so as to maintain a distance between the display substrate and the opposite substrate, and a thickness of the second spacer PS may be set to be between 2 μm and 5 μm, such as 3.5 μm. Since the thickness of the support parts S disposed in the same layer as the second spacer PS is the same as that of the second spacer PS, the thickness of the support parts S is much greater than that of the test signal line TL. Therefore, the region of the first spacing layer 2 where the support part S is disposed and the region of the first spacing layer 2 where the test signal line TL is disposed are not necessarily at the same height, which allows the support parts S to be arranged in a way more flexible than that described in the embodiment illustrated by FIG. 5a and FIG. 5b.

Figure 7A:
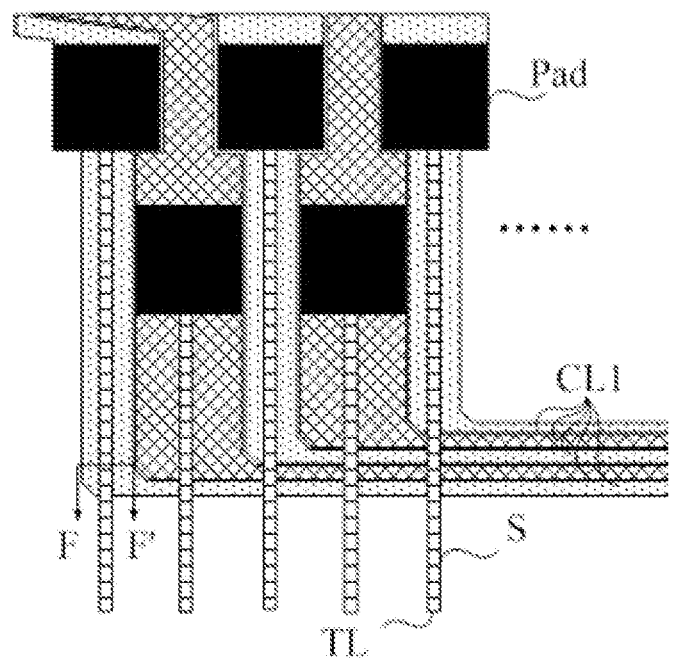
FIG. 7a is still another schematic diagram of a specific structure of a test pad region according to an embodiment of the present disclosure.
Figure 7B:
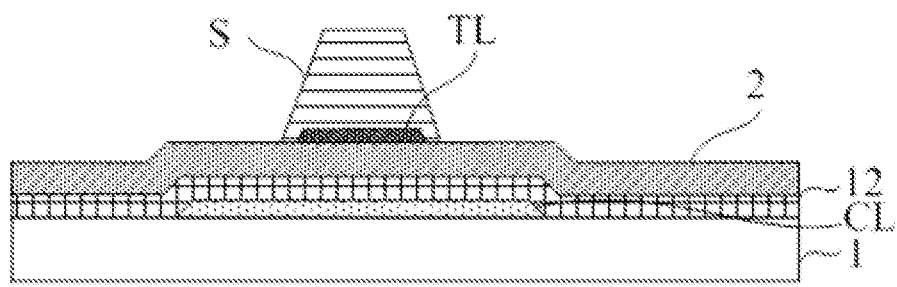
FIG. 7b is a sectional view of FIG. 7a taken along a line FF'.

FIG. 7a is still another schematic diagram of a specific structure of the test pad region according to an embodiment of the present disclosure, and FIG. 7b is a sectional view of FIG. 7a taken along a line FF'. As shown in FIG. 7a and FIG. 7b, in some implementations, the support parts S are disposed in the same layer as the second spacer PS in the display region AA, and at least part of each test signal line TL is covered by the support parts S, so that the test signal lines TL may be isolated from the outside, so as to be protected against external interference. Although only the support parts S covering the test signal lines TL are shown in FIG. 7a and FIG. 7b, it should be understood that, in the embodiments of the present disclosure, the support parts S may also be disposed between every two adjacent test signal lines TL in addition to the support parts S covering the test signal lines TL.

It should be noted that, compared to the embodiment illustrated by FIG. 5a and FIG. 5b, the embodiments illustrated by FIG. 6a to FIG. 6b and the embodiments illustrated by FIG. 7a and FIG. 7b are merely different in the arrangement of the support parts S, and the arrangement of the other elements is the same, and thus will not be repeated here. When the display substrate provided by the embodiments illustrated by FIG. 5a to FIG. 7b is adopted, there is no need to change the number of existing fabricating processes of a display substrate, which reduces the production cost.

An embodiment of the present disclosure further provide a display module, including: a bezel, and the display substrate described above. The bezel is supported by the support ends of the support parts, and an orthographic projection of the bezel on the display substrate surrounds the display region.

In the embodiment of the present disclosure, as shown in the drawings, the bezel is supported by the support parts, so that the bezel is spaced apart from the test signal line on the display substrate, and the metal part of the bezel is prevented from being in contact with the test signal line, thereby avoiding the problem of the consequent short circuit between the test signal lines.

The display module further includes an opposite substrate disposed opposite to the array substrate, and a liquid crystal layer located between the opposite substrate and the array substrate, and the second spacer disposed on the second spacing layer is disposed between the display substrate and the opposite substrate for maintaining a cell thickness of the liquid crystal layer.

The present disclosure further provides a display device, which may be any product or component with a display function, such as a vehicle-mounted display device, electronic paper, a mobile phone, a tablet computer, a television, a notebook computer, a digital photo frame, a navigator and the like. The display device includes the display module described above.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and these modifications and improvements are considered to fall within the scope of the present disclosure.

What is claimed is:

1. A display substrate having a display region and a test pad region disposed on a side of the display region, wherein the display substrate comprises:
   a base;
   at least one pad disposed on the base and located in the test pad region;
   a first spacing layer disposed on a side of the pad away from the base; and
   a plurality of support parts and at least one test signal line, which are located in the test pad region, wherein the support parts and the test signal line is disposed on a side of the first spacing layer away from the base, one end of each test signal line is connected to one pad, and the other end of each test signal line is configured to be connected to an array test device, and the support parts are made of an insulating material;
   wherein at least two of the plurality of support parts are arranged along a first direction which intersects a direction pointing to the test pad region from the display region, each of the support parts has a support end away from the base, and the support end projects from a surface of the test signal line on a side away from the base.

2. The display substrate of claim 1, wherein at least one first spacer is disposed on the base and located in the test pad region; and
   the first spacing layer covers the first spacer, and a portion of the first spacing layer opposite to the first spacer projects along a direction away from the base to form the support part.

3. The display substrate of claim 2, wherein a thin film transistor is further disposed on the base, and the first spacer is disposed in the same layer as an active layer of the thin film transistor.

4. The display substrate of claim 2, wherein the first spacer comprises a plurality of sub-spacers arranged at intervals, and the plurality of sub-spacers of the same first spacer are arranged along the direction pointing to the test pad region from the display region.

5. The display substrate of claim 1, further comprising: a first electrode, a second electrode and a second spacing layer, which are disposed in the display region, wherein the first electrode is disposed between the second spacing layer and the base, and the second electrode is disposed on a side of the second spacing layer away from the base; and
the first spacing layer and the second spacing layer are disposed in a same layer, and the test signal line and the second electrode are disposed in a same layer.

6. The display substrate of claim 5, further comprising a second spacer disposed in the display region and located on the side of the second spacing layer away from the base, wherein the support parts are disposed in the same layer as the second spacer.

7. The display substrate of claim 6, wherein at least part of each test signal line is covered by the support parts.

8. The display substrate of claim 5, further comprising a color filter and a thin film transistor, which are disposed in the display region, wherein the color filter is disposed on a side of the thin film transistor away from the base, and the first electrode is disposed on a side of the color filter away from the base.

9. The display substrate of claim 1, wherein the test signal line is located on the side of the pad away from the display region, and extends along the direction pointing to the test pad region from the display region;
the support parts each are in a shape of strip, and an extending direction in which the support parts extend is the same as an extending direction in which the test signal line extends; and/or
the support parts each are in a shape of block.

10. The display substrate of claim 9, wherein the display substrate comprises a plurality of test signal lines arranged along the first direction, and each of two sides of each test signal line along the first direction is provided with at least one of the support parts.

11. The display substrate of claim 10, wherein at least one of the support parts is disposed between any two adjacent test signal lines.

12. The display substrate of claim 1, wherein a thin film transistor is further disposed on the base,
the pad comprises a first body disposed in the same layer as a gate electrode of the thin film transistor; and/or
the pad comprises a second body disposed in the same layer as a source electrode and a drain electrode of the thin film transistor.

13. The display substrate of claim 1, further comprising a first connection line disposed in the test pad region, wherein one end of the first connection line is connected to the pad, and the other end of the first connection line is configured to be connected to a driver chip.

14. The display substrate of claim 1, wherein the base comprises a plurality of pads, which comprise at least one first pad and at least one second pad, and a distance from the first pad to the display region is smaller than that from the second pad to the display region; and
each first pad overlaps at least one second pad along the direction pointing to the test pad region from the display region.

15. The display substrate of claim 1, further comprising: a plurality of columns of sub-pixels and a plurality of data lines, which are disposed in the display region, wherein sub-pixels in a same column are connected to a same data line, and each of the sub-pixels is connected to the pad through the data line.

16. A display module, comprising: a bezel, and the display substrate of claim 1;
wherein the bezel is supported by support ends of the support parts, and an orthographic projection of the bezel on the display substrate surrounds the display region.

17. A display device, comprising the display module of claim 16.

18. The display substrate of claim 2, wherein a thin film transistor is further disposed on the base,
the pad comprises a first body disposed in the same layer as a gate electrode of the thin film transistor; and/or
the pad comprises a second body disposed in the same layer as a source electrode and a drain electrode of the thin film transistor.

19. The display substrate of claim 2, further comprising a first connection line disposed in the test pad region, wherein one end of the first connection line is connected to the pad, and the other end of the first connection line is configured to be connected to a driver chip.

20. The display substrate of claim 2, wherein the base comprises a plurality of pads, which comprise at least one first pad and at least one second pad, and a distance from the first pad to the display region is smaller than that from the second pad to the display region; and
each first pad overlaps at least one second pad along the direction pointing to the test pad region from the display region.

* * * * *